(12) United States Patent
Kajita et al.

(10) Patent No.: US 10,887,203 B2
(45) Date of Patent: Jan. 5, 2021

(54) DYNAMIC SCADA

(71) Applicant: SCHLUMBERGER TECHNOLOGY CORPORATION, Sugar Land, TX (US)

(72) Inventors: Marcos Suguru Kajita, Houston, TX (US); Clinton D. Chapman, Missouri City, TX (US); Hasanain Jwair, Houston, TX (US); Brian Dale Chancey, Bay City, TX (US); Nan Mu, Singapore (SG); Miguel Angel Lopez, Sugar Land, TX (US); William Grasham, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 153 days.

(21) Appl. No.: 15/557,166

(22) PCT Filed: Mar. 8, 2016

(86) PCT No.: PCT/US2016/021325
§ 371 (c)(1),
(2) Date: Sep. 11, 2017

(87) PCT Pub. No.: WO2016/144935
PCT Pub. Date: Sep. 15, 2016

(65) Prior Publication Data
US 2018/0048544 A1    Feb. 15, 2018

Related U.S. Application Data

(60) Provisional application No. 62/130,075, filed on Mar. 9, 2015.

(51) Int. Cl.
*G06F 15/173* (2006.01)
*H04L 12/26* (2006.01)
(Continued)

(52) U.S. Cl.
CPC ........ *H04L 43/065* (2013.01); *G05B 19/0423* (2013.01); *G05B 19/4185* (2013.01);
(Continued)

(58) Field of Classification Search
None
See application file for complete search history.

(56) References Cited

U.S. PATENT DOCUMENTS

| 6,973,416 B2 * | 12/2005 | Denny | ................. E21B 17/006 |
| | | | 702/188 |
| 2004/0226010 A1 * | 11/2004 | Suorsa | ..................... G06F 8/61 |
| | | | 717/174 |

(Continued)

FOREIGN PATENT DOCUMENTS

KR    10-2008-0072778 A    8/2008

OTHER PUBLICATIONS

International Search Report issued in International Patent Appl. No. PCT/US2016/021325 dated Aug. 26, 2016; 3 pages.
(Continued)

*Primary Examiner* — Phuoc H Nguyen
(74) *Attorney, Agent, or Firm* — Rodney Warfford

(57) ABSTRACT

A supervisory control and data acquisition (SCADA) unit and technique for managing communications over a network of defined capacity. The unit and techniques include safeguarding the network while allowing for operations to proceed at an oilfield. The safeguards allow for multiple additional and different types of equipment to be added to or removed from the network while being managed by a single SCADA unit. This may be achieved through unique filtering protocols which prevent unidentified and/or unconfirmed equipment and devices from being added to the network merely due to be detected at the oilfield.

19 Claims, 6 Drawing Sheets

(51) Int. Cl.
  *G05B 19/418* (2006.01)
  *G05B 19/042* (2006.01)
  *H04L 29/08* (2006.01)

(52) U.S. Cl.
  CPC .............. *G05B 2219/24215* (2013.01); *G05B 2219/32404* (2013.01); *H04L 67/12* (2013.01); *Y02P 90/02* (2015.11)

(56) References Cited

U.S. PATENT DOCUMENTS

| | | | |
|---|---|---|---|
| 2006/0173976 A1 | 8/2006 | Vincent et al. | |
| 2007/0277982 A1 | 12/2007 | Shampine et al. | |
| 2008/0082983 A1* | 4/2008 | Groetzner | G06F 9/5083 718/105 |
| 2008/0173480 A1* | 7/2008 | Annaiyappa | E21B 15/00 175/24 |
| 2008/0208476 A1* | 8/2008 | Karami | E21B 43/00 702/6 |
| 2008/0231466 A1* | 9/2008 | Mazrooee | H04L 12/4625 340/853.1 |
| 2010/0192212 A1* | 7/2010 | Raleigh | G06Q 10/06375 726/7 |
| 2011/0022641 A1* | 1/2011 | Werth | H04L 67/34 707/803 |
| 2012/0204142 A1* | 8/2012 | Rubenstein | G06F 8/30 717/101 |
| 2013/0191896 A1* | 7/2013 | Adderly | H04W 12/06 726/6 |
| 2014/0277772 A1 | 9/2014 | Lopez et al. | |
| 2014/0366105 A1 | 12/2014 | Bradley et al. | |
| 2014/0370879 A1* | 12/2014 | Redding | H04M 3/42178 455/419 |
| 2014/0379923 A1* | 12/2014 | Oberg | H04L 63/20 709/226 |
| 2015/0181415 A1* | 6/2015 | Raleigh | H04W 8/22 455/418 |
| 2015/0293829 A1* | 10/2015 | Culshaw | G11C 29/022 714/733 |

OTHER PUBLICATIONS

Written Opinion issued in International Patent Appl. No. PCT/US2016/021325 dated Aug. 26, 2016; 9 pages.

* cited by examiner

DYNAMIC SCADA

CROSS REFERENCE TO RELATED APPLICATION(S)

This Patent Document claims priority under 35 U.S.C. § 119(e) to U.S. Provisional Application Ser. No. 62/130,075, entitled Detection and Configuration of Dynamic SCADA System, filed on Mar. 9, 2015, which is incorporated herein by reference in its entirety.

BACKGROUND

Exploring, drilling and completing hydrocarbon and other wells are generally complicated, time consuming and ultimately very expensive endeavors. As a result, over the years, well architecture has become more sophisticated where appropriate in order to help enhance access to underground hydrocarbon reserves. For example, as opposed to wells of limited depth, it is not uncommon to find hydrocarbon wells exceeding 30,000 feet in depth. Furthermore, today's hydrocarbon wells often include deviated or horizontal sections aimed at targeting particular underground reserves. Indeed, at targeted formation locations, it is quite common for a host of lateral legs and fractures to stem from the main wellbore of the well toward a hydrocarbon reservoir in the formation.

In addition to ever increasing depth and architectural complexity, well management over time is also often more dynamic. For example, production may be drawn from one lateral leg at one time but, depending on changes in the overall production profile and well conditions, the leg may be isolated at a later time to further production. Indeed, bringing legs or other zonal regions of the well on and off line over the course of the life of the well may be quite common.

Completing and managing wells of such extended depth and complexity includes the positioning and coordination of a host of large scale equipment at the oilfield. Whether drilling, cementing casing for the main bore, placing liners in lateral legs, running a fracturing application, or zonally managing production, substantial amounts of equipment may be utilized. In the case of cementing or fracturing, for example, a host of different pumps, blenders and other equipment are generally managed by a supervisory control unit. More specifically, this may be referred to as a Supervisory Control and Data Acquisition (SCADA) unit.

An operator may watch and interface with a SCADA unit as it carries out predetermined protocols for varying applications performed by the equipment at the oilfield. In many cases, the unit is employed to carry out one application followed by another or the particular equipment being utilized may require a change out. For example, the same SCADA may be communicatively linked to one pump for a given application. However, the pump may fail or be inadequate for a subsequent application being run through the SCADA. Either way, the need arises for the pump to be replaced by another pump.

In order to bring new equipment "on line" or into operational communication with the SCADA so that operations may continue some step by step maneuvering must generally be taken. That is, the SCADA network over which the unit and equipment may communicate is of a fairly defined capacity. Once more, this capacity is very highly safeguarded to prevent overloading the network. In this way, potentially catastrophic failure of operations due to an overloaded network may be avoided. By way of a more specific example, an overloaded network might lead to pump or engine failure and ultimately the need for a multi-million dollar workover of the well. Thus, in order to prevent such unnecessary consequences due to network failure, adding and removing equipment from the network is done so with step by step care.

With reference to the examples above, in a situation where a new pump is to be brought on line, a detection step may first be undertaken. That is, the operator may acquire a unique ID for the pump such as its IP address and provide the information to the SCADA unit. This may be preceded by removal of an old pump identification from the SCADA. In this way, the unit may sense that a new piece of equipment is now on-line and available for controlling.

Ideally, a new piece of equipment being brought on line as described above is as simple as the example of replacing one defective pump with a new identical pump, with the only difference from the perspective of the SCADA being one of a switched out IP address. That is, detection may take place followed by operating without the requirement of also re-configuring the set up. In this situation, the operations may proceed as before, with the SCADA software managing the same types of sensor and other data from the new pump equipment as before. Unfortunately, however, this may not always be the situation.

In some situations, the newly available pump or equipment may be a different model. This may be desirable in theory, for example, where the equipment is a newer improved model of greater efficiency or providing additional sensor data. However, given the limited network capacity and the uniqueness of the software for the specific operations ongoing at the oilfield, the new equipment is at first incompatible with the SCADA. That is, the software will require complete reconfiguration in order for the SCADA to controllably interface with the new equipment. This would likely take several months. Thus, as a practical matter, the operator is left with utilizing the older, less desirable equipment if still possible or proceeding without any replacement until a more similar replacement may be found that does not require such reconfiguration.

SUMMARY

A method of managing communications over a network of a defined capacity with a supervisory control and data acquisition unit at an oilfield is described. The method includes a given piece of equipment communicating with the unit while an additional piece of equipment is positioned at the oilfield, both pieces of equipment to contribute to running operations at the oilfield. With the positioning of the additional equipment, it may be detected with the unit and evaluated thereby according to a predetermined protocol as a prerequisite to being connected to the network so as to reduce a likelihood of breaching the defined capacity thereof. Additionally, the method may include circumstances where the operations precede the detecting and evaluating of the additional equipment but nevertheless go on substantially continuously during the noted detecting and the evaluating.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain embodiments of oilfield operations. Specifically, stimulation operations involving fracturing of a well are detailed herein. However, other types of oilfield operations may benefit from the equipment and techniques detailed herein. For example, a supervisory control and data acquisition unit may be utilized to monitor and/or control a host of different types of operations at an oilfield. Indeed, so long as a single unit is uniquely employed for communication with multiple types of equipment over a network while safeguarding network capacity, appreciable benefit may be realized.

Figure 1:
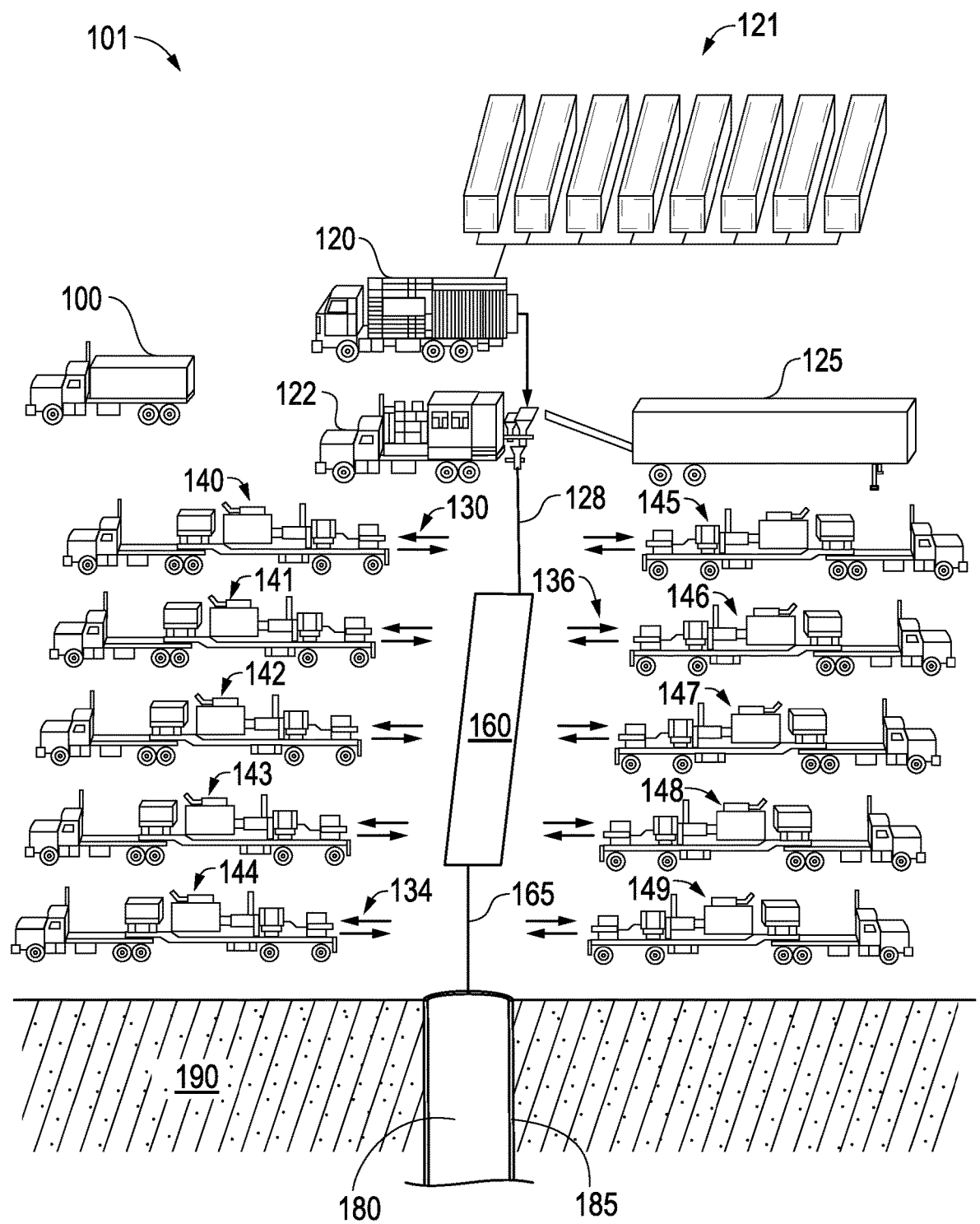
FIG. 1 is an overview depiction of an oilfield with an embodiment of a dynamic SCADA unit employed to manage communications with different equipment types.

Referring now to FIG. 1, an overview depiction of an oilfield 101 is shown with an embodiment of a dynamic supervisory control and data acquisition (SCADA) unit 100 employed to manage communications with different equipment types over a network. Specifically, the unit 100 is positioned at the oilfield 101 to manage stimulation operations, for example, to apply a fracturing application to a formation 190 defining a well 180 at the oilfield. In the embodiment shown, the well 180 is defined by casing 185 and may obtain a fracturing slurry from an application line 165 running thereto.

In order to provide a high pressure fracturing slurry to the application line 165 for the noted application, a series of multiplex pumps 140-149 may be utilized. Specifically, low pressure slurry may be routed from an intake line 128 to a manifold 160. The manifold 160 in turn may circulate the slurry over circulation lines 130-139 to and from each pump 140-149 so as to provide fracturing application pressure of 7,500 PSI or more. As with traditional operations, the SCADA unit 100 may be utilized to direct the various pumps 140-149 in this regard. However, the SCADA unit 100 is also equipped with a dynamic ability to add on and direct additional types of equipment for the operations as described below without undue risk of exceeding network capacity.

Continuing with reference to FIG. 1, in addition to pumps 140-149, a mixer 120 is provided where water or other base fluid from tanks 121 may be combined with a viscosifying agent to provide a linear gel. That is, as with other similar operations, a linear gel or viscosified fluid may be initially formed and transported to a blender 122 where the fracturing slurry is formed from this fluid and proppant from a proppant source 125. Thus, the mixer 120 and blender 122 constitute additional pieces of equipment for the operation. In the embodiment shown, the unit 100 may be utilized to monitor and/or regulate these pieces of equipment 120, 122 as opposed to requiring separate control by a separate unit. This means that the unit 100 is configured to control not only the same pieces of equipment such as the pumps 140-149 but also different types of equipment (e.g. pumps 140-149 and mixers 120/blenders 122). In an embodiment, the unit 100 is configured to control other types of pressure pumping equipment such as, but not limited to, proppant management systems, liquid additive systems, manifolds, tanks, and/or combinations thereof.

Of course, it is advantageous to control and/or monitor the various pieces of equipment 140-149, 120, 122 with the same unit 100 and not having to coordinate different dedicated control units. However, this also means that unique precautions to protect the network over which communications takes place is warranted so as to avoid crashing the network to potentially catastrophic consequence to the operations.

Figure 2:
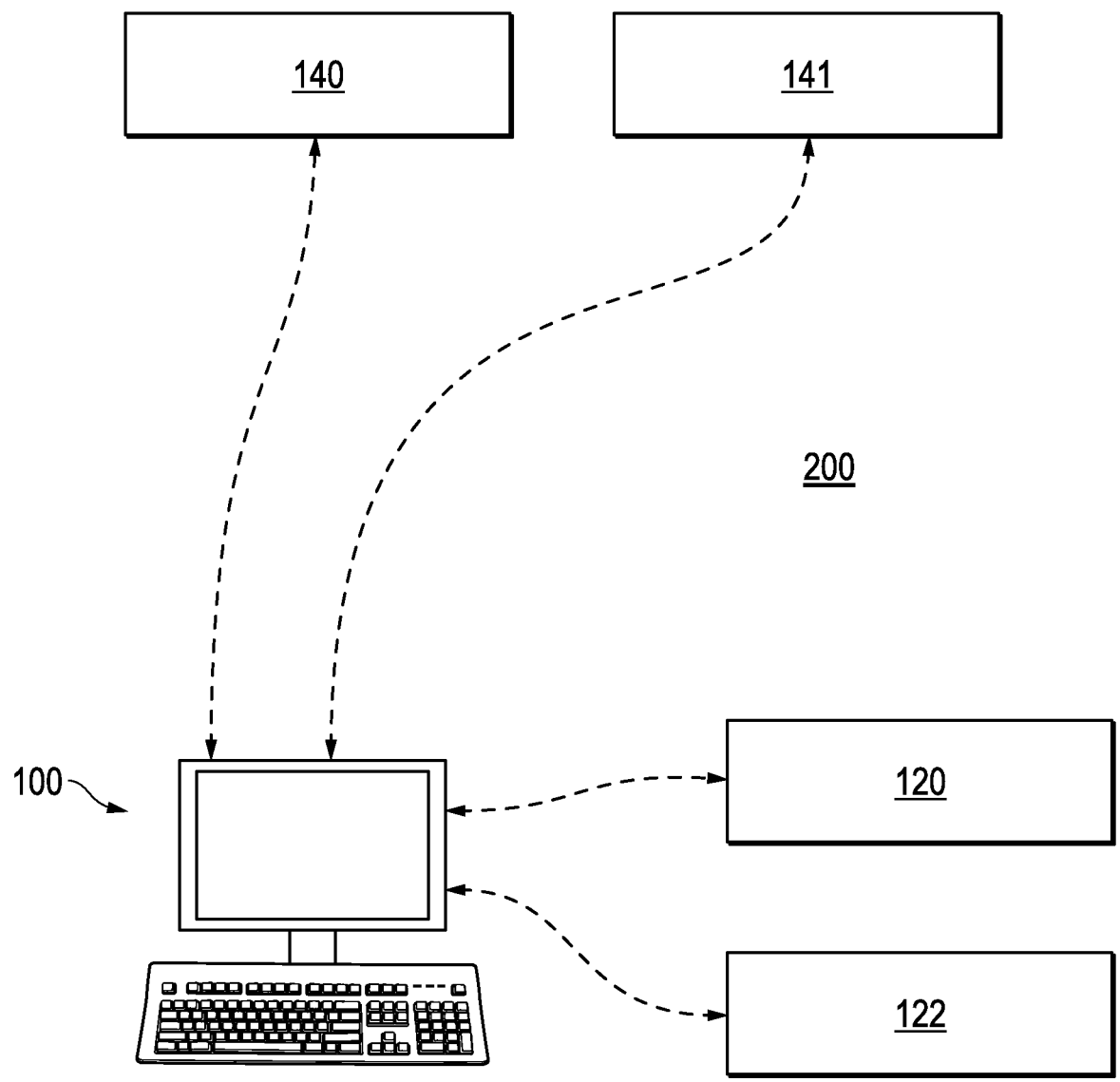
FIG. 2 is a schematic representation of the dynamic SCADA unit and different managed equipment types of FIG. 1 on a network.

Referring now to FIG. 2, a schematic representation of the dynamic SCADA unit 100 is shown. Specifically, two-way communications between the unit 100 and different types of equipment 140, 141, 120, 122 over a network 200 are depicted schematically in contrast to the overview of FIG. 1. Additionally, in this view, it is presumed that the pump equipment 140, 141 constitutes one type of equipment whereas the mixer 120 and blender 122 constitute another type of equipment. For example, the unit 100 may be geared toward receiving, processing and managing data (such as real-time data) related to pressure, flow, temperature, density and other detections with regard to each type of equipment 140, 141, 120, 122. However, the software run by the unit 100 may be tailored to interface the different equipment types differently. For example, pressure detections by the unit 100 as in regard to the pumps 140, 141 may be processed entirely differently than those from the mixer 120 and blender 122. Similarly, rpm directions to the mixer 120 and blender 122 may be undertaken as part of an entirely different protocol than those directed at the pumps 140, 141. The network 200 may be a secure network, as will be appreciated by those skilled in the art. The network may be made a secure network by using standard industrial standards and/or techniques such as Wi-Fi Protected Access (WPA), Advanced Encryption Standard (AES), or similar secure network standards or techniques.

In spite of the markedly different types of interfacing, the same unit 100 is utilized to govern the different equipment types as indicated above. This inherently means that different types of equipment may be added to the network 200 at least during the initial setup. Indeed, in the examples detailed further below, additional equipment beyond the pumps 140, 141, mixer 120 and blender 122 may be added to the network. In fact, in one embodiment, this may even be done during ongoing operations.

Referring now to FIGS. 3A-3D, a schematic representation of embodiments for adding new equipment 300 to the network 200 for management by the dynamic SCADA unit 100 are detailed. Specifically, as alluded to above, techniques for adding equipment 300 are shown which allow for operations to remain ongoing at the oilfield 101 if the operator desires. That is, there is no requirement of halting operations for sake of communications and/or network integrity, though, for safety, mechanical or other reasons, the operator may choose to alter or halt operations during setup of the new equipment 300. Furthermore, the adding of the equipment 300 takes place without substantial compromise to network capacity. This is because the manner in which the equipment 300 is added safeguards the network 200.

Figure 3A:
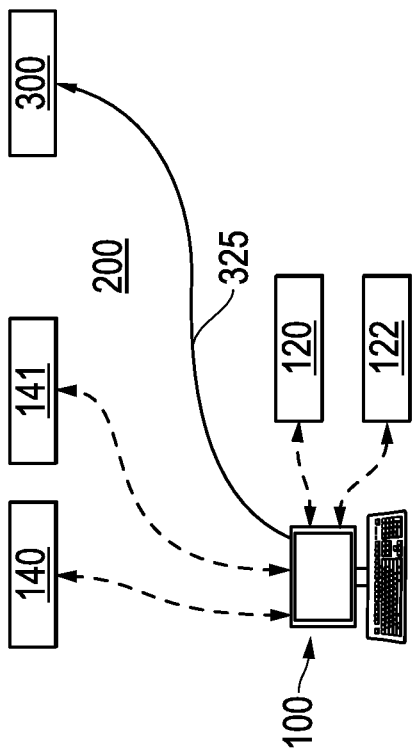
FIG. 3A is a schematic representation of the dynamic SCADA unit and equipment types of FIG. 2 with a new piece of equipment presented.

With specific reference to FIG. 3A, the new piece of equipment 300 is presented at the oilfield 101 of FIG. 1. However, it is not automatically added to the network 200 or managed by the SCADA unit 100. Indeed, in the embodiment shown, even if the new equipment 300 is identical to the pumps 140, 141 or one of the mixers/blenders 120, 122, it is still not automatically added. That is, even though the software run at the unit 100 would still be run in essentially the same manner due to the new piece of equipment 300 matching an old piece, the equipment is initially kept off the network 200.

In the embodiment shown, the network 200 may be a conventional Wi-Fi network based on IEEE standards, though other types of networks and standards may be utilized. With added reference to FIG. 1, the unit 100 may undergo an ongoing scan of the oilfield 101 for any new equipment 300. Thus, as shown in FIG. 3A, a new piece of equipment 300 may be detected. However, rather than adding the equipment 300 to the network 200 a series of filtering steps are then taken.

Figure 3B:
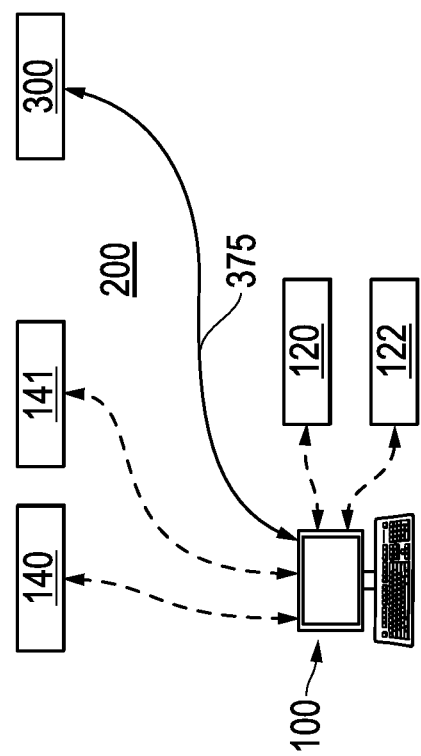
FIG. 3B is a schematic representation of the dynamic SCADA unit and equipment types of FIG. 3A with the new equipment piece detected and queried by the unit.

Referring now to FIG. 3B, once a new piece of equipment 300 is detected, the unit 100 submits a query (see arrow 325) to the equipment 300. Specifically, the unit 100 requests identification information from the equipment 300. For example, in a conventional Wi-Fi network 200 this may include seeking an IP address for the equipment 300. In the query submission 325, the unit 100 may also request configuration information from the equipment 300.

Figure 3C:
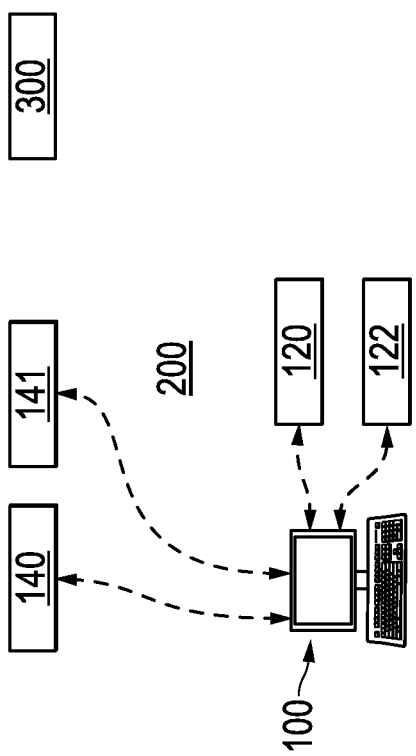
FIG. 3C is a schematic representation of the dynamic SCADA unit and equipment types of FIG. 3B with the new equipment piece identified to the unit.

With specific reference to FIG. 3C, the new equipment 300 is shown providing identification information to the SCADA unit 100 (see arrow 350). While it may seem natural to presume that a request for identification information would be followed by the equipment 300 providing the information, this is not necessarily a given in all cases. For example, considering that the network 200 may operate at conventional Wi-Fi protocols, a host of communicating devices may be detected by the unit 100 as shown in FIG. 3A that are not intended to be a part of operations. Cell phones, laptops, and other devices unrelated to ongoing oilfield operations may be detected by the unit 100. However, rather than compromising the network and adding all detected devices to the network, the query 325 and provided identification 350 takes place as a prerequisite. In this way, the new equipment 300 is identified and a confirmation that the equipment 300 speaks an understandable language to the unit 100 occurs, as confirmed by the unit 100 understanding of the provided identification 350.

In circumstances where the new equipment 300 does not have or is unable to communicate identifying information understandable to the unit 100 or is unable to establish communication to the unit, it is excluded from the network 200. So, for example, the risk of overloading the network 200 with various operator cell phones is eliminated. Furthermore, even where the new equipment 300 is fully identified to the unit 100, it is still not immediately added to the network 200. For example, with added reference to FIG. 1, the new equipment 300 may be a new type of blender commonly employed in similar operations but not actually intended for use in the current operations at the oilfield 101.

Figure 3D:
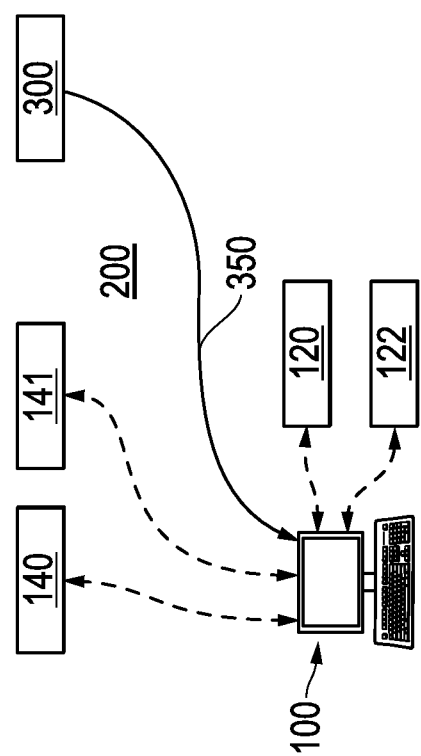
FIG. 3D is a schematic representation of the dynamic SCADA unit and equipment types of FIG. 3C with the new identified equipment initialized against a predetermined protocol.

Referring now to FIG. 3D, the new equipment 300 which has been identified and understood by the SCADA unit 100 is now initialized (see arrow 375) following a cross-check for relevance. Specifically, the equipment 300 is cross-checked against a pre-stored catalogue of equipment that is relevant to the particular ongoing operations. Thus, even if the equipment 300 is of a type commonly used at the oilfield 101 of FIG. 1 as opposed to, for example, a cellphone, it is still not added to the network 200 unless actually relevant to the operations. Nevertheless, once determined to be relevant, the equipment 300 may be automatically added to the network 200 without requiring manual input by the operator. In this sense, the unit 100 both safeguards the network 200 but also automatically adds to it in a user-friendly manner where appropriate. In an embodiment, the unit 100 successfully retrieves equipment identification information to assist in determining that the equipment 300 is relevant.

This added level of safeguarding means that instead of requiring a dedicated unit 100 for each piece of equipment or equipment type, a single unit 100 may be utilized that is truly supervisory as to all relevant equipment for the operations. That is, instead of protecting the network 200 by having different dedicated SCADA units communicating with only certain equipment types of equipment, a unique filtering protocol may be utilized as described hereinabove in conjunction with a single dynamic SCADA unit 100. This unit 100 may be loaded with software and processing capacity sufficient for establishing communication, controlling, communicating, and/or acquiring real-time data with a host of different types of equipment. Thus, the arrival of a new piece of equipment 300 does not necessarily require any reconfiguration. In an embodiment, the unit 100 may identify special configuration information and/or parameters about the equipment 300. The configuration information and/or parameters may include details for operation of the equipment 300 in order that the unit 100 may properly establish and manage the control of the equipment 300. In an embodiment, the unit 100 may validate any special configuration parameters of the equipment 300 in order to allow the equipment 300 to be properly controlled by the unit 100.

Figure 4:
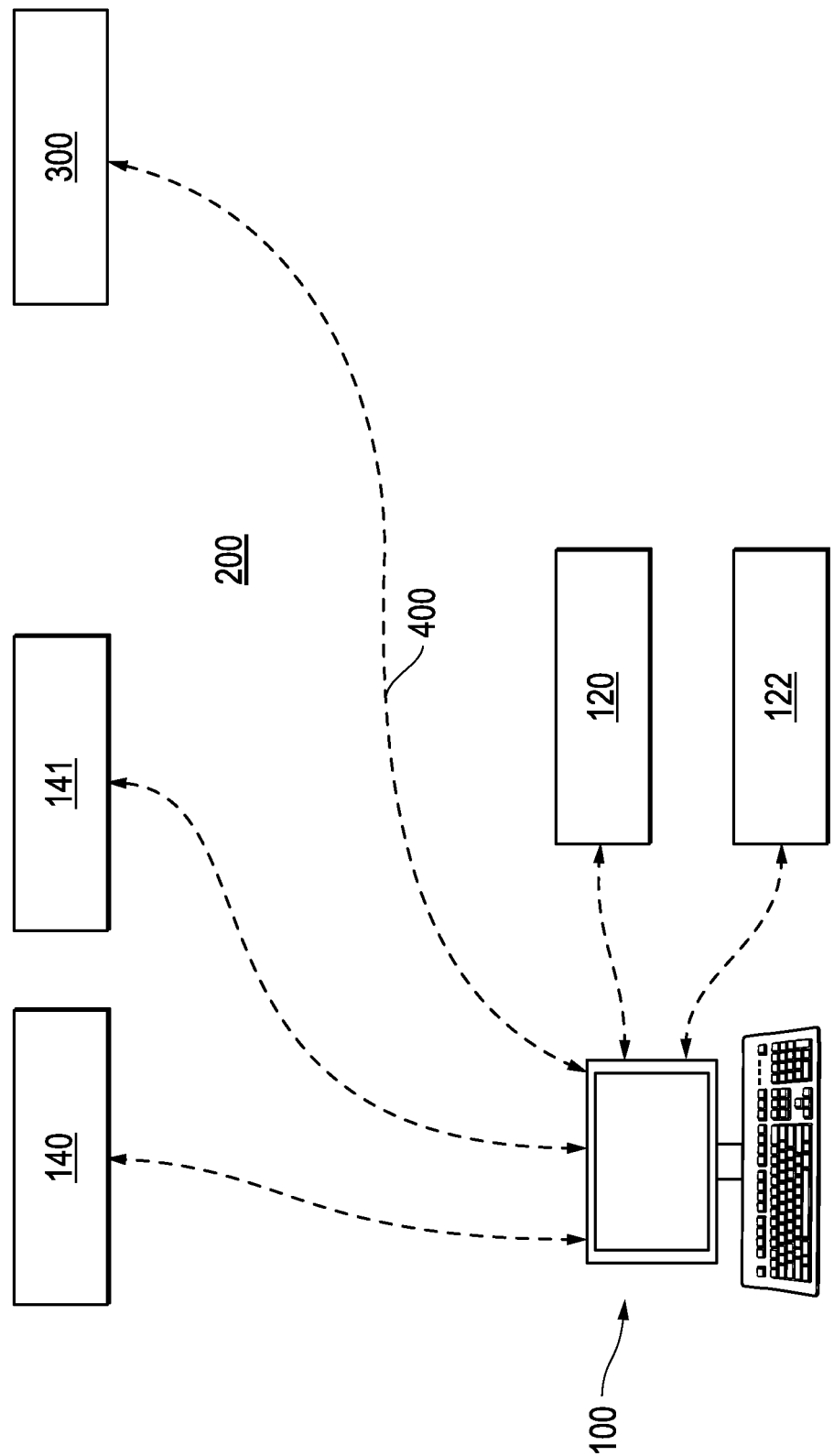
FIG. 4 is an overview depiction of the oilfield of FIG. 1 with the dynamic SCADA unit thereof managing communications with given different equipment types and a new piece of equipment.
Figure 5:
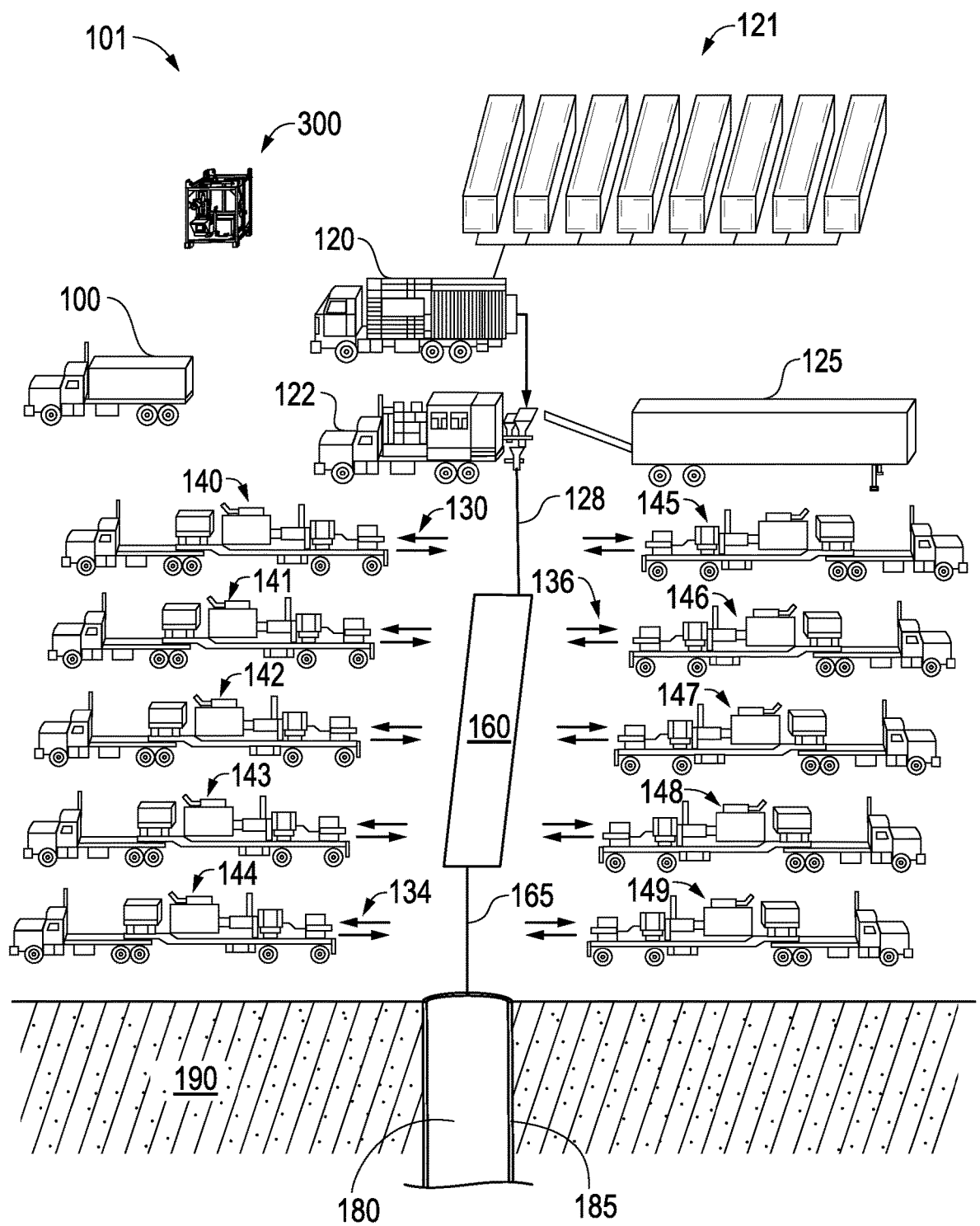
FIG. 5 is an overview depiction of an oilfield with an embodiment of a dynamic SCADA unit employed to manage added communication with a new type of equipment.

Referring now to FIG. 4, the identified, compatible and relevant new piece of equipment 300 is now controlled and run by the SCADA unit 100 in the same manner as the other equipment 140, 141, 120, 122 (see arrow 400). This new piece of equipment 300 may be a new pump, mixer or blender similar to the old equipment 140, 141, 120, 122 or it may be an entirely new type of equipment. Regardless, it is relevant to the operations and determined so in advance of being placed on the network. establishing and managing control or real-time data acquisition using Referring now to FIG. 5, another overview depiction of the oilfield 101 is shown now with the added equipment 300 managed by the dynamic SCADA unit 100. Specifically, the new equipment 300 is a new type of equipment in the form of a monitoring unit to provide information regarding the linear gel from developed by the mixer 120. That is, the equipment 300 is neither a pump 140-149 nor a mixer/blender 120, 122. Regardless, with added reference to FIGS. 3A-3D, by following the protocol detailed hereinabove, the adding of the new equipment 300 to the network 200 takes place in a manner that assures network capacity is safeguarded allowing operations to proceed without undue risk of any potential catastrophic overload.

Figure 6:
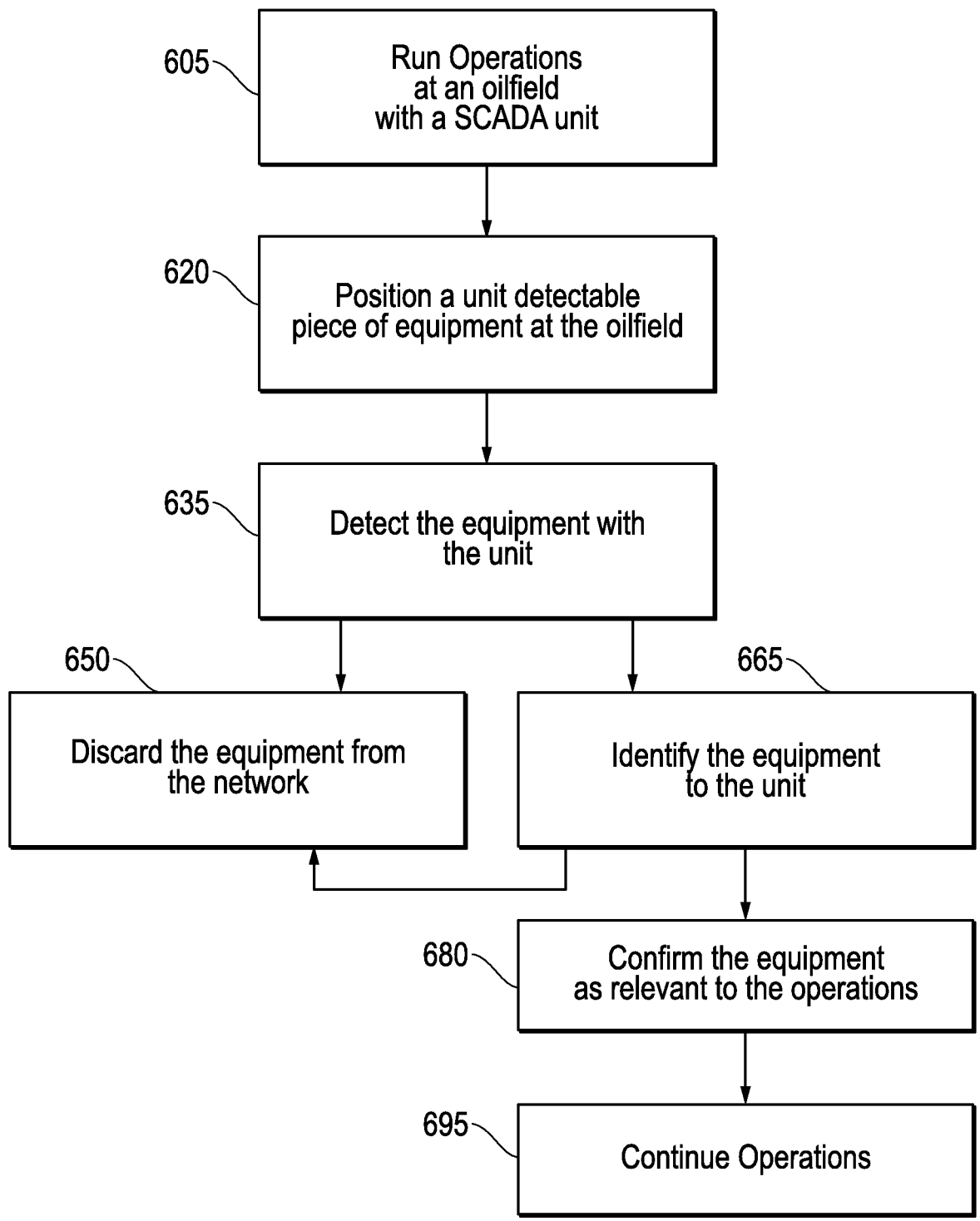
FIG. 6 is a flow chart summarizing an embodiment of utilizing a dynamic SCADA to manage communications over an oilfield network.

Referring now to FIG. 6, a flow chart summarizing an embodiment of utilizing a dynamic SCADA unit to manage communications over an oilfield network is shown. As detailed above, operations may proceed with a single unit managing one or more different types of equipment as indicated at 605. Alternatively or additionally, a new piece of detectable equipment may be positioned at the oilfield as indicated at 620. Once detected by the unit as noted at 635 it still may or may not be added to the network. For example, if the equipment is identified as indicated at 665, it may or may not be confirmed as relevant to operations as indicated at 680. If the equipment is not confirmed as relevant it will be discarded or excluded from the network (see 650). Additionally, if never identified to the unit in the first place as noted at 665, the new equipment would again be discarded from the network (again see 650). Of course, once confirmed as relevant, operations may continue as noted at 695. This may even include continuing operations during the adding of the new equipment. Additionally, equipment may similarly be removed during operations which also may continue in an ongoing fashion.

Embodiments described above allow for SCADA unit communication over a network with different types of oilfield equipment. Once more bringing a new piece of equipment on line to the network may take place without undue risk of overloading the network or the requirement of re-configuring the SCADA software even where the equipment is of a new type. Instead, the software and processor of the SCADA unit may be more flexible and of a higher capacity, respectively. Once more, bringing the new piece of equipment onto the network may take place in a step by step safeguarded fashion to help ensure that the network capacity remains protected throughout. Thus, as a practical matter, operations may change over time based on operator discretion, conditions and available equipment therefor and not substantially hampered by network or SCADA limitations.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A method of managing communications over a network of a defined capacity with a supervisory control and data acquisition unit at an oilfield, the method comprising:
   communicating with given equipment at the oilfield over the network with the unit;
   positioning additional equipment at the oilfield, wherein the given equipment and the additional equipment are configured to contribute to running oilfield operations at the oilfield as directed by the unit over the network;
   detecting the additional equipment with the unit;
   evaluating the additional equipment according to a predetermined protocol to confirm whether the additional equipment is relevant to the oilfield operations by retrieving equipment identification information for the additional equipment, and cross-checking the additional equipment against a pre-stored catalogue of relevant equipment for the oilfield operations based on the equipment identification information; and
   connecting the additional equipment over the network in response to confirming that the additional equipment is relevant to the oilfield operations, thereby reducing a likelihood of breach of the defined capacity.

2. The method of claim 1 further comprising:
   utilizing the unit to conduct an ongoing scan of the oilfield for the additional equipment in advance of the detecting; and
   submitting a query for the equipment identification information to the additional equipment from the unit after the detecting.

3. The method of claim 1 wherein evaluating the additional equipment comprises identifying the additional equipment to the unit before confirming that the additional equipment is relevant to the oilfield operations.

4. The method of claim 3 further comprising excluding other equipment from the network that is unidentified to the unit or unconfirmed as relevant to the oilfield operations.

5. The method of claim 3 wherein the identifying the additional equipment to the unit comprises communicating with the additional equipment in a language understandable by the unit.

6. The method of claim 1 wherein the network comprises a secure network.

7. The method of claim 1 wherein the confirming that the additional equipment is relevant comprises validating any special configuration parameters of the additional equipment for the oilfield operations at the unit.

8. The method of claim 1 wherein the running of the oilfield operations precedes the detecting and the evaluating of the additional equipment and continues continuously during the detecting and the evaluating of the additional equipment.

9. The method of claim 1 wherein the connecting of the additional equipment to the network takes place automatically in absence of manual input of an operator.

10. The method of claim 1 further comprising removing one of the given equipment and the additional equipment from the network.

11. A method of managing communications over a network of a defined capacity with a supervisory control and data acquisition unit at an oilfield, the method comprising:
   communicating with one or more types of equipment at the oilfield over the network with the unit; and
   excluding all other equipment at the oilfield from the network in response to determining that the other equipment is unidentified to the unit or unconfirmed by the unit as relevant to oilfield operations at the oilfield, wherein the excluding comprises:
      running a cross-check of the other equipment against a pre-stored catalogue of relevant equipment for the oilfield operations; and
      determining that the other equipment is not in the pre-stored catalogue to determine that the other equipment is unconfirmed as relevant to the oilfield operations.

12. The method of claim 11 wherein the excluding comprises presenting a communication from the other equipment to the unit that is not understood by the unit to determine that the other equipment is unidentified to the unit.

13. A multi-equipment system for running oilfield operations at an oilfield, the system comprising:
   a supervisory control and data acquisition unit at the oilfield for governing access to a communication network of a defined capacity;
   a first piece of equipment for communication with the unit over the network; and a second piece of equipment for communication with the unit over the network, the second piece of equipment of a different type than the first, wherein the first piece of equipment and the second piece of equipment are each connected to the communication network in response to being identified to the unit and confirmed as relevant to the oilfield operations by using the supervisory control and data acquisition unit to retrieve equipment identification information for the first piece of equipment and the second piece of equipment, and to cross-check the first piece of equipment and the second piece of equipment against a pre-stored catalogue of relevant equipment for the oilfield operations based on the equipment identification information.

14. The system of claim 13 further comprising another piece of equipment at the oilfield that is excluded from the network in response to the other piece of equipment being unidentified to the unit or unconfirmed by the unit as relevant to the oilfield operations.

15. The system of claim 13 wherein the first piece of equipment and the second piece of equipment are selected from a group consisting of pumps, mixers, blenders, proppant management systems, liquid additive systems, manifolds, tanks, monitoring units, and combinations thereof.

16. The system of claim 13 wherein the network is a Wi-Fi network secured using a standard industrial technique that comprises Wi-Fi Protected Access (WPA) or Advanced Encryption Standard (AES).

17. The system of claim 13 wherein the unit comprises software for running different types of oilfield operations and sufficient processing capacity therefor.

18. The system of claim 13 wherein the oilfield operations are stimulation operations directed at a well of the oilfield as directed by the unit.

19. The system of claim 18 wherein the stimulation operations comprise a fracturing application directed at the well.

* * * * *